United States Patent [19]

Kleeb et al.

[11] Patent Number: 4,874,726

[45] Date of Patent: Oct. 17, 1989

[54] LIGHTWEIGHT FUSED SILICA REFRACTORY COMPOSITIONS

[75] Inventors: Thomas R. Kleeb, Pittsburgh; Berhl E. Wishon, Bethel Park, both of Pa.

[73] Assignee: Dresser Industries, Inc., Dallas, Tex.

[21] Appl. No.: 121,951

[22] Filed: Nov. 18, 1987

[51] Int. Cl.⁴ .................... C04B 33/14; C04B 35/10; C04B 38/08

[52] U.S. Cl. .................................. 501/124; 501/120; 501/128; 501/131

[58] Field of Search .............. 501/124, 128, 120, 131; 106/DIG. 1, DIG. 2

[56] References Cited

U.S. PATENT DOCUMENTS

| | | | |
|---|---|---|---|
| 3,939,897 | 2/1976 | Kaneko et al. | 164/103 |
| 4,331,773 | 5/1982 | Hongo et al. | 501/128 |
| 4,656,146 | 4/1987 | Schlett et al. | 501/124 |
| 4,687,752 | 8/1987 | Peters | 501/121 |

FOREIGN PATENT DOCUMENTS 1279096  6/1972  United Kingdom ............... 501/124

*Primary Examiner*—William R. Dixon, Jr.
*Assistant Examiner*—Deborah Jones
*Attorney, Agent, or Firm*—Sigalos, Levine & Montgomery

[57] ABSTRACT

A refractory composition comprising a fused silica composition comprising a silica compound and a binder and for each 100 parts by weight of said fused silica composition from about 3 to 15 parts by weight of alumina-silica based hollow microspheres.

4 Claims, No Drawings

LIGHTWEIGHT FUSED SILICA REFRACTORY COMPOSITIONS

BACKGROUND OF THE INVENTION

The present invention relates to refractory compositions capable, when mixed with water or other fluid, of forming hydraulic-setting castable and gunning refractories for lining various vessels and transfer lines used in the processing of materials, the compositions having high abrasion resistance and a relatively low thermal conductivity.

While a large number of castable and gunning compositions per se are old and well known, there are many special attributes required depending on the conditions of use which often renders those presently available not entirely suitable.

Thus, for example, castable refractories used in the petrochemical industry for lining transfer lines employed in fluid catalytic cracking and fluid coking units are not entirely satisfactory due to their high thermal conductivity. Efforts to reduce the termal conductivity by addition of lightweight aggregates such as perlite, vermiculite and the like have not been satisfactory since the strength of the resultant cast or gunned refractory is greatly reduced.

The present castables are also not entirely satisfactory since in such lines the catalysts; which are aluminum based, and the coke are highly abrasive and travel at elevated speeds creating significant erosion problems throughout the entire system. Gunning mixes used for such purposes also lack the necessary low thermal conductivity, abrasion resistance, and desired strength.

U.S. Pat. No. 4,656,146 discloses an improved abrasion-resistant refractory composition for petrochemical applications and it does overcome the prior art problem of having a low thermal conductivity with an acceptable density. However, while generally satisfactory, such castable still does not have the degree of abrasion resistance combined with low thermal conductivity that is desired.

SUMMARY OF THE INVENTION

The present invention provides a refractory composition having high abrasion resistance, low thermal conductivity, and adequate strength with an acceptable density which is especially suitable for petrochemical application.

Briefly, the present invention comprises a refractory composition comprising a fused silica castable comprising a silica compound, and a binder; and for each 100 parts by weight of said fused silica castable from about 3 to 20 parts by weight of alumina-silica based microsphere.

DETAILED DESCRIPTION

The essential aspect of the instant invention is the utilization of the alumina-silica based microspheres. As used herein the term "alumina-silica based microspheres" is intended to cover alumina-silica hollow alumina spheres in which the shell is composed of about 50 to 60% silica ($SiO_2$), 30 to 40% alumina ($Al_2O_3$), and the balance iron oxides and trace elements. Such microspheres are commercially available under the trade name "FILLITE". It has been found that such spheres markedly decrease the thermal conductivity and yet maintain good abrasion resistance and strength, particularly where there is exposure to such erosive materials as alumina or coke that is present in the catalytic cracking systems of the petroleum industry.

As to the fused silica castable, it can be any conventional fused silica system presently used in forming castables such as those disclosed in U.S. Pat. No. 4,656,146. These contain a major amount of vitreous silica, optionally a calcined refractory aggregate such as fireclay, tabular alumina, bauxite, spinel, and mixtures thereof, and a binder. The binders conventionally used are calcium aluminate, calcium silicate, lignin liquors, and phosphate binders such as mono-aluminum phosphate. For the present compositions it is preferred to use a calcium aluminate cement.

Such castable composition can contain the various components in their usual amounts; ordinarily about 40–95 weight percent of the silica compound, preferably vitreous silica, about 5–25 weight percent of the calcined refractory aggregate (if used), and the balance the calcium aluminate cement.

As to the alumina-silica based microspheres, it is preferred to use the free-flowing hollow alumina-silica microspheres having a particle size of about 1 to 300 microns; preferably about 30 to 300 microns. Ordinarily, it should be added in an amount of at least about 3 to 15 weight percent for each 100 parts by weight of the silica castable in order to get the lower thermal conductivity desired together with low lightweight castable product, without sacrificing the abrasion resistance or strength.

Amounts above about 15 weight percent ordinarily are not satisfactory in that while giving a lower thermal conductivity the product lacks the desired strength.

A mix can be formed by simply admixing the components. When it is to be applied the castable can be formed in the usual manner by adding thereto water or other fluid conventionally used to form the hydraulic-setting castable refractory which is then applied to the surface of the petrochemical vessel or the line in the same manner as presently used castables.

The invention will be further described in connection with the following examples which are set forth for purposes of illustration only.

EXAMPLE 1 TO 4

A series of four different compositions were formed, cast, and then tested for strength, abrasion resistance, and thermal conductivity. The results are set forth in Table I below.

TABLE I

| Example | 1 | 2 | 3 | 4 |
|---|---|---|---|---|
| Mix: | | | | |
| Vitreous Silica | | | | |
| −3 + 10 mesh | 28% | 28% | 27% | 26% |
| −10 + 28 mesh | 19.8 | 19.8 | 19 | 18 |
| −28 + 65 mesh | 13.2 | 13.2 | 12 | 11 |
| −65 mesh | 4 | 1 | — | — |
| Calcium Aluminate Casting Grade Cement (CA-25C) | 35 | 35 | 35 | 35 |
| Alumina-silica microspheres (FILLITE 52/7/S) | — | 3 | 7 | 10 |
| Plus Addition: | | | | |
| Water | 10.3 | 11.0 | 11.0 | 11.7 |
| Casting method: | -Externally Vibrated- | | | |
| Casting Characteristics: | All mixes cast and flowed well- | | | |
| Bulk Density, pcf (Av 8) | | | | |
| After Drying at 250° F.: | 125 | 119 | 112 | 106 |
| After 1500° F. Reheat: | 118 | 112 | 105 | 100 |
| Modulus of Rupture, psi (Av 3) | | | | |

TABLE I-continued

| Example | 1 | 2 | 3 | 4 |
|---|---|---|---|---|
| After Drying at 250° F.: | 1450 | 1440 | 1235 | 1075 |
| After 1500° F. Reheat: | 915 | 800 | 670 | 680 |
| Cold Crushing Strength, psi (Av 3) | | | | |
| After Drying at 250° F.: | 7180 | 6380 | 5940 | 4545 |
| After 1500° F. Reheat: | 5085 | 3990 | 3540 | 3290 |
| Apparent Porosity, % (Av 3) | | | | |
| After Drying at 250° F.: | 17.1 | 19.4 | 20.2 | 22.6 |
| Apparent Specific Gravity (Av 3): | 2.44 | 2.38 | 2.28 | 2.23 |
| 1500° F.Reheat (Av 3) | | | | |
| Linear Change, %: | 0 | 0 | 0 | 0 |
| Volume Change, %: | +0.3 | −0.1 | 0 | 0 |
| ASTM C-704 Abrasion Test | | | | |
| After 1500° F. Reheat (Av 3) Erosion Loss, cu cm: | 10.5 | 13.7 | 15.9 | 23.0 |
| Thermal Conductivity at 1000° F. | | | | |
| (BTU-in/ft$^2$-hr.-° F.):** | 8.95 | 7.23 | 7.01 | 6.6 |

**By hot wire method

It will be seen that those compositions containing the microspheres had lower thermal conductivity as compared to the composition (Example 1) containing no microspheres. The abrasion resistance and strength of the compositions containing the microspheres was satisfactory.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A refractory composition consisting essentially of a fused silica composition containing about 40 to 95 weight percent vitreous silica, up to about 25 weight percent of a calcined refractory aggregate, and the balance a calcium aluminate cement; and for each 100 parts by weight of said fused silica composition from about 3 to 15 parts by weight of alumina-silica based hollow microspheres.

2. The refractory composition of claim 1 including a fireclay, tabular alumina, buaxite, spinel, or mixtures thereof.

3. The refractory composition of claim 1 wherein the aggregate is fireclay.

4. The refractory composition of claims 1, 2, or 3 wherein the microspheres have a particle size of from about 30 to 300 microns.

* * * * *